(12) United States Patent
Brewer et al.

(10) Patent No.: US 10,094,410 B2
(45) Date of Patent: Oct. 9, 2018

(54) LOCKBOLT

(71) Applicant: ADVEL UK LIMITED, Sheffield (GB)

(72) Inventors: Jonathan Brewer, Dunstable (GB); Carl Hersant, Hertford (GB)

(73) Assignee: ADVEL UK LIMITED (GB)

( * ) Notice: Subject to any disclaimer, the term of this patent is extended or adjusted under 35 U.S.C. 154(b) by 404 days.

(21) Appl. No.: 14/428,139

(22) PCT Filed: May 29, 2013

(86) PCT No.: PCT/GB2013/051420
§ 371 (c)(1),
(2) Date: Mar. 13, 2015

(87) PCT Pub. No.: WO2014/041328
PCT Pub. Date: Mar. 20, 2014

(65) Prior Publication Data
US 2015/0252833 A1 Sep. 10, 2015

(30) Foreign Application Priority Data

Sep. 13, 2012 (GB) .................................. 1216367.1

(51) Int. Cl.
F16B 19/05 (2006.01)
B21J 15/02 (2006.01)
(Continued)

(52) U.S. Cl.
CPC ............... F16B 19/05 (2013.01); B21J 5/022 (2013.01); B21J 9/12 (2013.01); B21J 13/06 (2013.01);
(Continued)

(58) Field of Classification Search
CPC ..... B21J 5/022; B21J 13/06; B21J 9/12; B21J 15/022; F16B 19/05; Y10T 29/49915; Y10T 29/53735
See application file for complete search history.

(56) References Cited

U.S. PATENT DOCUMENTS 1,629,925 A * 5/1927 Moore .................. B25B 31/005
29/238
3,091,982 A 6/1963 Siebol
(Continued)

FOREIGN PATENT DOCUMENTS

| CN | 101912941 A | 12/2010 |
| EP | 1981665 A1 | 10/2008 |

(Continued)

OTHER PUBLICATIONS

International Search Report and Written Opinion for PCT/GB2013/051420, dated Nov. 4, 2013, 12 pages.

Primary Examiner — David Bryant
Assistant Examiner — Lee A Holly
(74) Attorney, Agent, or Firm — Vorys, Sater, Seymour and Pease LLP; Rex W. Miller, II

(57) ABSTRACT

A lockbolt for installation into apertured workpiece members, comprising a pin having a head and a tail end provided with locking grooves and a single pull groove, wherein an installation tool having a collet with a corresponding shape to the pull groove is used to apply an increasing pulling force to the pin tail, thereby to push the collet towards the workpiece, and as the force applied by the hydraulic piston further increases, causing the collar to be swaged into the lock grooves, and halting the force applied by the tool either at a predetermined maximum value or when the pin tail breaks at a breaker groove formed by the single pull groove.

20 Claims, 17 Drawing Sheets

(51) Int. Cl.
*B21J 5/02* (2006.01)
*B21J 9/12* (2006.01)
*B21J 13/06* (2006.01)

(52) U.S. Cl.
CPC ....... *B21J 15/022* (2013.01); *Y10T 29/49915* (2015.01); *Y10T 29/53735* (2015.01)

(56) References Cited

U.S. PATENT DOCUMENTS

| | | | | |
|---|---|---|---|---|
| 3,295,404 | A * | 1/1967 | Baker | B21J 15/022 411/361 |
| 4,299,519 | A | 11/1981 | Corbett | |
| 4,813,834 | A | 3/1989 | Smith | |
| 4,995,777 | A * | 2/1991 | Warmington | F16B 19/05 411/361 |
| 5,213,460 | A * | 5/1993 | Sadri | F16B 19/1063 411/361 |
| 6,532,635 | B1 * | 3/2003 | Gregory | B21J 15/043 29/243.523 |
| 7,448,823 | B2 | 11/2008 | Silva | |
| 2005/0276658 | A1 | 12/2005 | Silva | |
| 2008/0170926 | A1 * | 7/2008 | Taylor | B21J 15/043 411/43 |

FOREIGN PATENT DOCUMENTS

| | | |
|---|---|---|
| GB | 858882 A | 1/1961 |
| GB | 2039336 A | 8/1980 |
| JP | 1980-094011 A | 7/1980 |
| JP | 2011/017443 A | 1/2011 |
| WO | 87/00891 A1 | 2/1987 |
| WO | 2008/054397 A1 | 8/2008 |

* cited by examiner

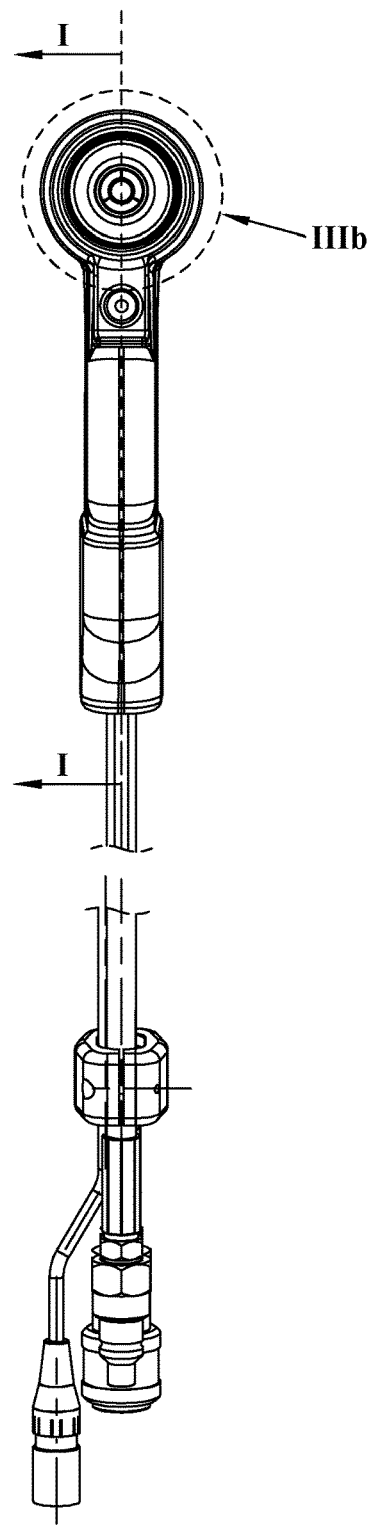
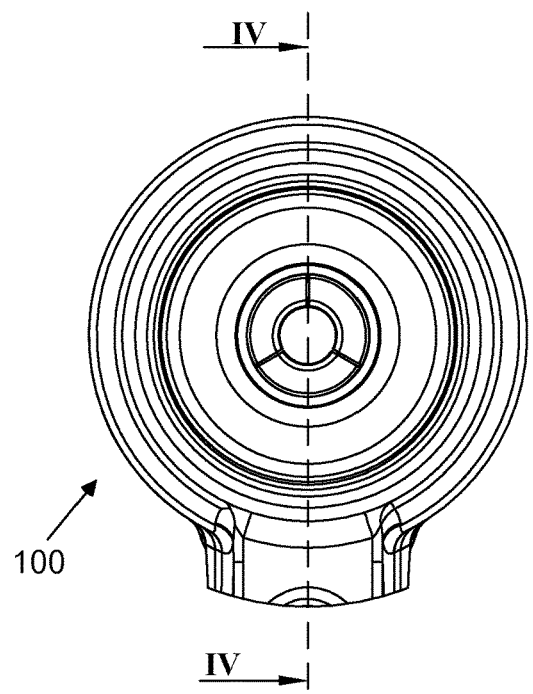
Figure 3b
Figure 3a

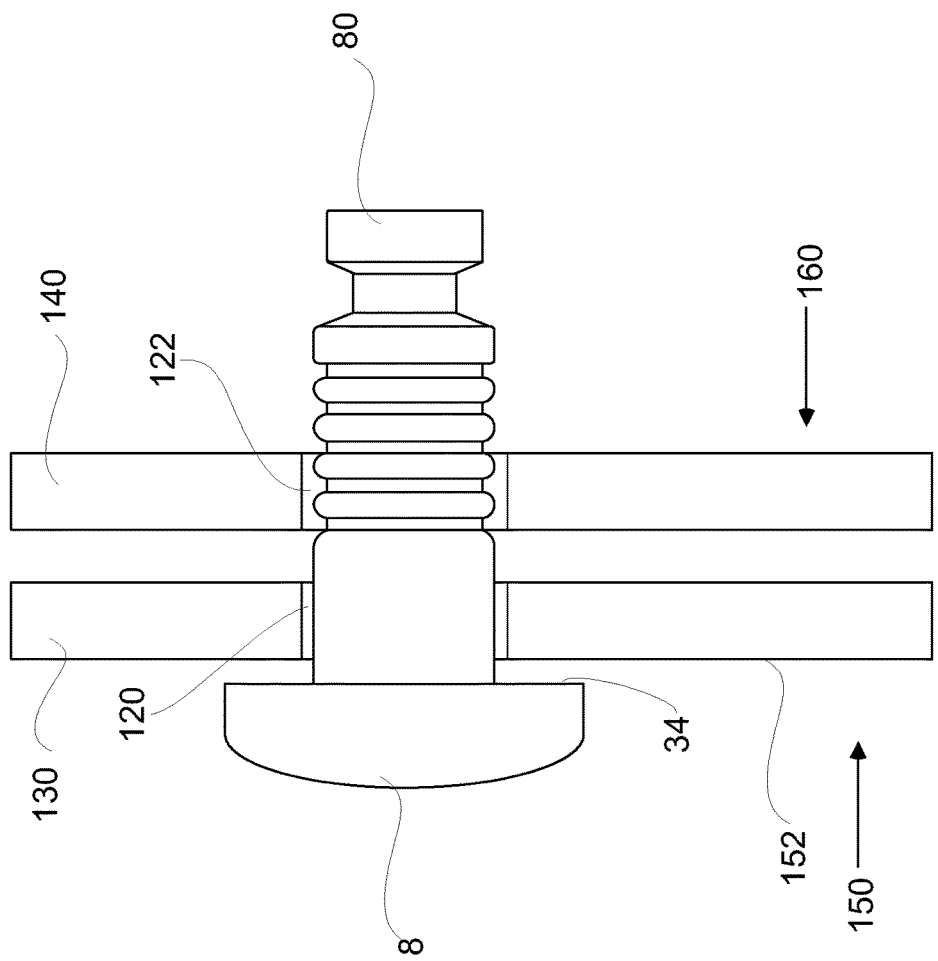

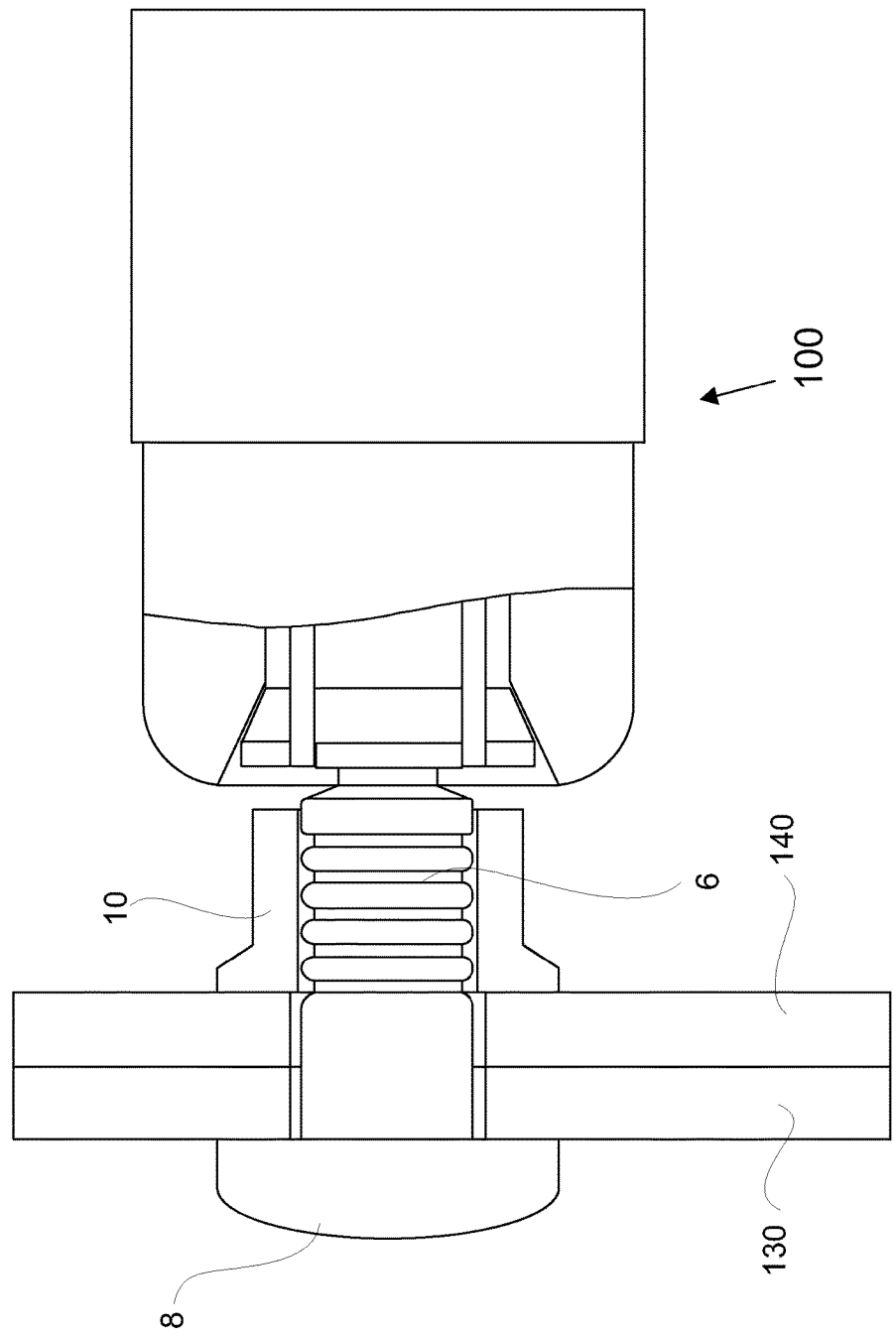

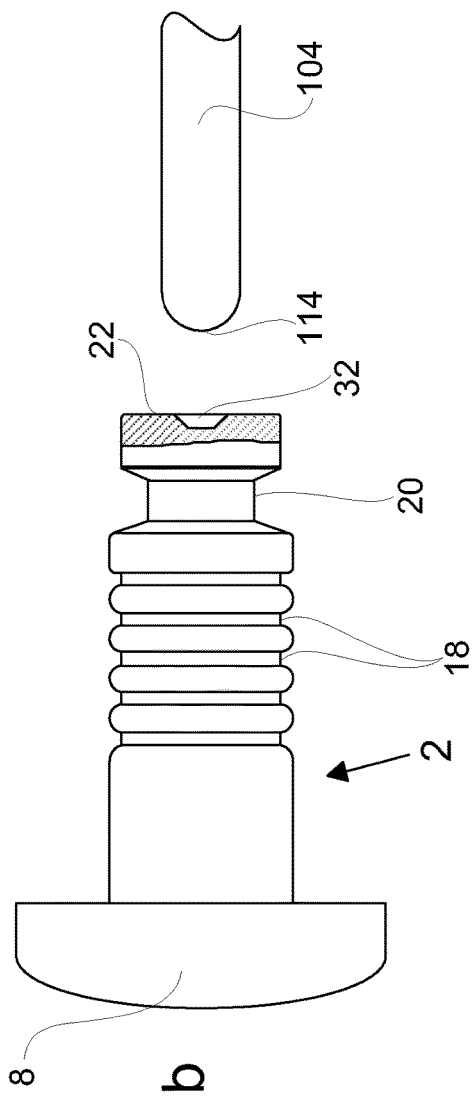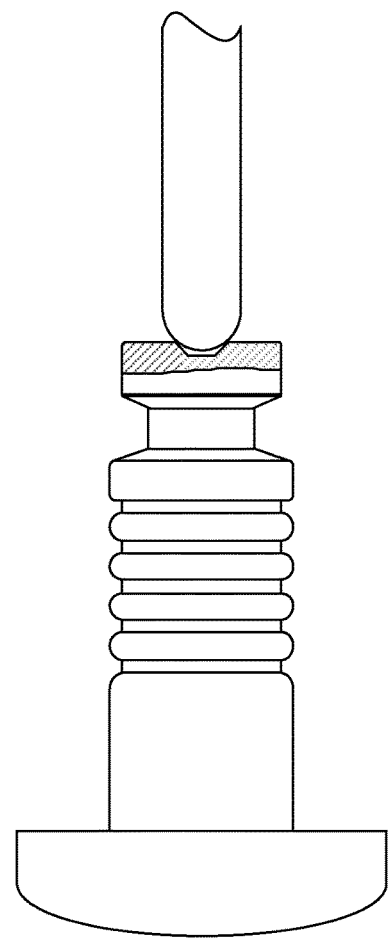

LOCKBOLT

This application is a United States national stage application of International Application No. PCT/GB2013/051420, filed May 29, 2013, by which this application also claims priority to and the benefit of United Kingdom patent application GB 1216367.1, filed Sep. 13, 2012. The disclosures of both applications are hereby incorporated herein by reference in their entirety.

This invention relates to a lockbolt fastener for securing apertured workpiece members together.

A known lockbolt fastener, as disclosed in UK patent GB2444420 (Huck International Inc.), comprises a pin having a short, small diameter pin tail which does not break on installation of the fastener into a workpiece. The lockbolt of GB '420 comprises a plurality of pull grooves provided on the pin portion, which are engaged by a plurality of collet teeth provided on the installation tool.

A problem with the non-breakstem lockbolt fastener as disclosed in GB2444420 is that the crests of the teeth of the installation tool may not engage sufficiently with the shallow grooves provided on the pin, e.g. the crests of the teeth may be caused to close directly onto the crests of the pull grooves, which can cause increased loads and slippage, thereby causing damage to the tool and/or fastener.

It is also possible for the tool teeth not to engage all fastener pulling grooves in an axial direction, which can lead to overstressing and stripping of the loaded pulling grooves on the fastener.

The multiple pull grooves and tool teeth of the prior art embodiments are also sensitive to angled entry into the collet, therefore the operator is required to check that the fastener is correctly aligned within the collet before actuating the tool.

A further disadvantage of the current non-breakstem lockbolt fasteners such comprising a plurality of pull grooves is that the narrow, shallow pull grooves, and also the shallow pulling teeth on the tool, can easily become clogged with debris, particularly in dirty working environments. Fine pitch multiple groove collet teeth are also much more vulnerable to damage by sand and small stones common to the outdoor environments in which these heavy duty lockbolt fasteners are often used (e.g. building of solar power plant structures in desert locations).

Manufacturing of multiple pull grooves lockbolts requires complex and therefore expensive thread rolling tooling, and the multiple pull groove forms generated on the pin are difficult and time consuming to inspect in production, therefore increasing time and cost of production.

Multiple collet teeth on an installation tool require small radii around the teeth, which increases stresses and leads to premature cracking. These teeth are also more complex to manufacture and inspect, and so are more costly.

Furthermore, any misalignment of the collet teeth and the pulling grooves, or pitch error between the teeth and the pulling grooves due to normal manufacturing tolerances, may result in an uneven distribution of pulling load and therefore generate higher localised stresses that lead to premature failure.

Some currently known non-breakstem lockbolt fasteners also include helical locking grooves into which the collars are swaged, which can be disadvantageous in that tampering or working loose could lead to the collar becoming unscrewed from the locking grooves.

Furthermore, the protruding end of the installed lockbolt could include sharp pull groove crests, therefore presenting a risk of injury to the operator or other personnel.

It is an aim of the present invention to provide a lockbolt which overcomes the above disadvantages.

Accordingly the present invention comprises, in a first aspect, a lockbolt in accordance with claim 1 of the appended claims.

As the present invention has only a single relatively large pull groove, rather than a plurality of relatively small pull grooves, this enables easier operator engagement of the tool with the pin as angular alignment and axial positioning are less critical than with prior art embodiments comprising multiple pull grooves. Furthermore, because alignment and positioning are less critical than with prior art embodiments, it is quicker and simpler for the operator to enter the pin into the tool nose, thereby leading to improved installation productivity.

The single pull groove of the present invention is less likely to become clogged with debris than the shallower multiple grooves of prior art embodiments.

The lockbolt of the present invention can be manufactured more simply and cheaply than prior art multiple pull groove lockbolts. It is also much less susceptible to manufacturing tolerances, as the groove is much larger/deeper than previous embodiments, and therefore the effect of tolerances is much reduced. Furthermore, no pitch error is possible with the single pull groove.

The locking grooves of the present invention are entirely, or substantially, annular in form, and so ensure that separation of the collar from the pin by an unscrewing action cannot occur after installation of the lockbolt, e.g. the collar cannot become separated from the pin via rotation.

Preferably, the contact surface of the single pull groove is provided by a tapered portion.

Preferably, the end section of the pin tail of the lockbolt is shorter than the locking portion, and has a maximum diameter which is smaller than a maximum diameter of the locking portion.

Preferably, the ratio of the minimum diameter of the single pull groove to the maximum diameter of the locking portion is within the range 0.50 to 0.78.

Preferably, the ratio of the maximum diameter of the end portion to the maximum diameter of the locking portion, is within the range 0.7 to 1.0.

Preferably the ratio of the total length of the pin tail over which the pull groove and the end portion extends, to the maximum diameter of the locking portion, is within the range 0.7 to 1.2.

Preferably, the ratio of the length of the pin tail over which the pull groove extends, to the to the maximum diameter of the locking portion, is within the range 0.3 to 0.7.

Preferably, the ratio of the length of the pin tail over which the end portion extends, to the maximum diameter of the locking portion, is within the range 0.26 to 0.5.

Preferably, the pull groove includes a first tapered section and a second tapered section and a plain portion between the first and second tapered section, the groove root having a constant cross-sectional area throughout its length. Alternative embodiments could feature alternative profiles of pull groove.

Preferably, the lockbolt includes a retaining feature, which retains the collar in an initial assembly position on the pin after the operator has placed the pin and collar in the workpiece and before the installation tool is actuated to install the lockbolt by swaging of the collar. The retaining feature ensures that the collar will not fall from the pin tail before installation can be effected, which is particularly advantageous in difficult working conditions, such as when the pin axis is vertical with the tail end pointed down. In addition the retention prevents accidental pushing of the pin back out of the collar as the tool nose is being engaged onto the pin tail by the Operator. Furthermore engaging the retaining feature ensures the pull groove protrudes sufficiently from the collar to allow engagement of the tool nose an collet.

The retaining feature may comprise a shallow axial slot or flat provided on the pin tail, which allows a tab provided on the throughbore of the collar to pass down to a first locking groove into which the collar tab can be rotated to engage, i.e. in a 'push-and-twist' motion.

The retaining feature may alternatively comprise a short helical screw thread provided on a section of the locking portion adjacent the pull groove, and a corresponding short screw thread, helix or tab provided in the throughbore of the collar which engage. In this embodiment, on installation of the lockbolt, the collar swages predominantly or entirely into the annular locking grooves beyond, therefore there is no risk of unscrewing of the collar and pin.

A further alternative retaining feature may comprise an elastomeric bead or ring, provided either on the throughbore of the collar or on the locking grooves of the pin tail.

The retaining feature provides a sufficient degree of retention force to maintain the collar on the pin until the installation tool is used to for the next stage of installation. When the installation tool is actuated, the retention force is overcome by the swaging stroke of the installation tool, and is weak enough not to adversely influence the sheet take-up and swaging action of the collar during installation into the workpiece.

The portion of the pin tail that remains protruding from the swaged collar of the installed lockbolt is free of sharp features and therefore presents a lower risk of personal injury than do the pintail of prior art embodiments having multiple grooves with sharp crests to each groove.

In an alternative embodiment, the pin tail is configured to be broken off during installation of the lockbolt in a workpiece. This embodiment is advantageous in situations wherein the added weight or length of a pin tail cannot be accommodated. Furthermore, this embodiment is advantageous when the material of the pin does not present a corrosion risk at the fracture surface, e.g. stainless steel or aluminium alloy pins.

In further aspects, the present invention also provides apparatus for, and a method of, installing a lockbolt in accordance with the present invention.

The collet of the installation tool used in the present invention does not protrude beyond the front of the nosepiece, and therefore presents a much lower risk of operator injury than prior art embodiments as the collet pulls in and closes together. There is also less chance of collet damage if the tool is dropped heavily.

The relatively large internal lip of the collet of the present invention is also less likely to become clogged with debris, or damaged by sand and small stones in dirty/outdoor working environments than the multiple fine pitch collet teeth of prior art tools.

As the collet internal lip of the present invention does not require the small radii at the root of pull jaw teeth that are required with prior art multiple pulling jaw tools, stresses on the internal lip will be lower than in the jaws of prior art tools, and premature cracking is much less likely.

Preferably, the installation tool further comprises a depressible plunger, wherein the tool is disabled whilst the plunger is not depressed. This provides a safety feature as the tool cannot be actuated accidentally.

The plunger may have a rounded tip, which is engageable with a dimple provided in the end face of the lockbolt pin tail. The engagement of the rounded plunger tip ensures that the pin tail is in the correct position within the installation tool, i.e. that it is inserted fully in the axial direction within the tool nose and is not titled at an unacceptable angle relative to the tool axis, before actuation of the tool, thereby preventing damage to the tool or harm to the operator.

Preferably, part of the collet of the installation tool has a shape complimentary to at least part of the shape of the pull groove.

The invention will now be described by way of example only and with reference to the accompanying figures in which:

FIG. 3a is a front view of the installation tool of FIG. 1 (with the lockbolt removed for clarity), and illustrates at line I where the cross-sectional view of Figure is taken;

FIG. 3b is a detailed view of part of the installation tool as indicated at area IIIb on FIG. 3a;

FIGS. 6 to 15 show stages of installation of a lockbolt in accordance with the present invention, the tool, workpiece and lockbolt being in cross-section or partial cross section.

Figure 7:
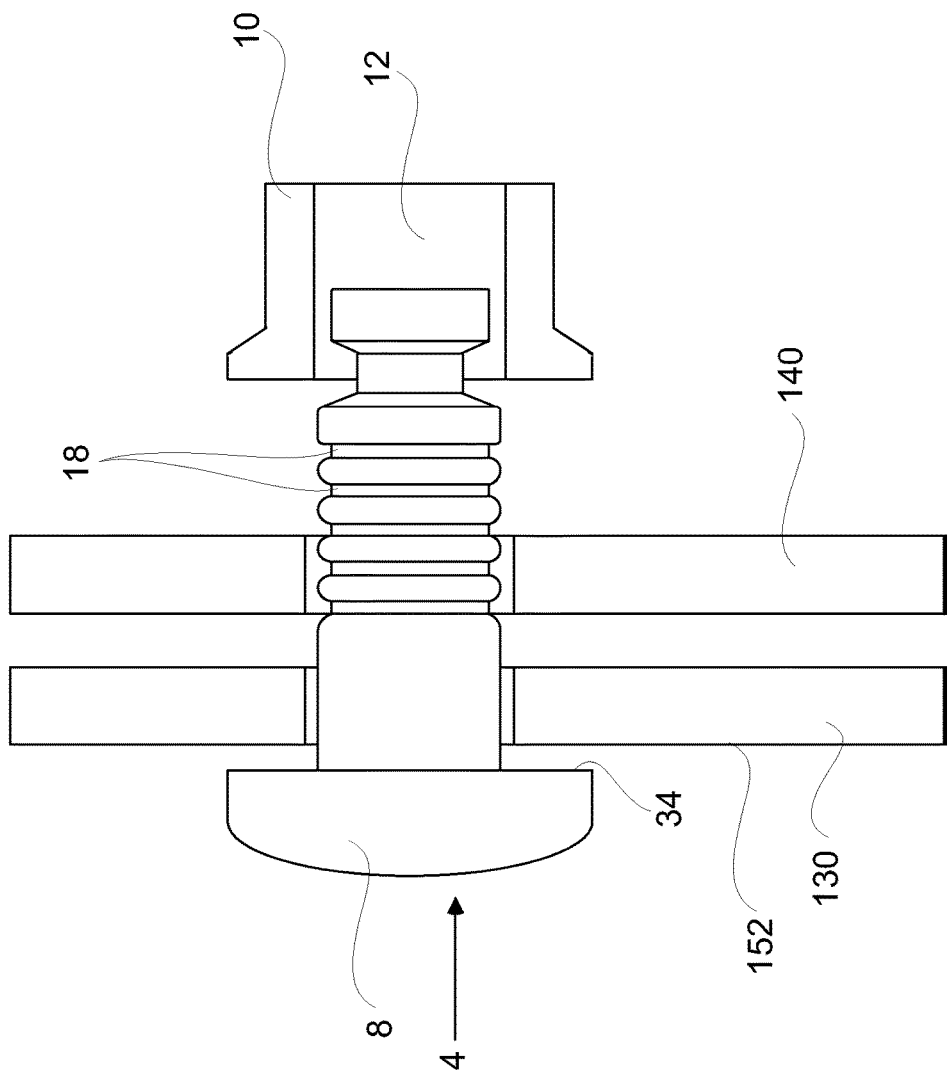
Figure 8:
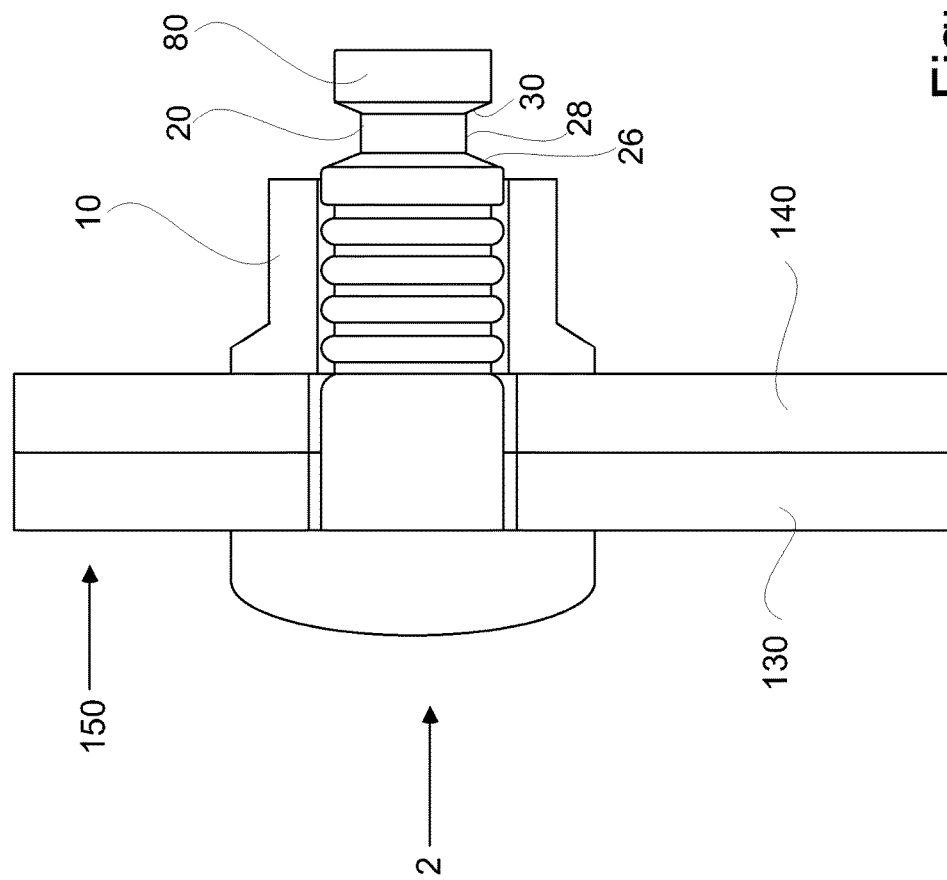
Figure 9:
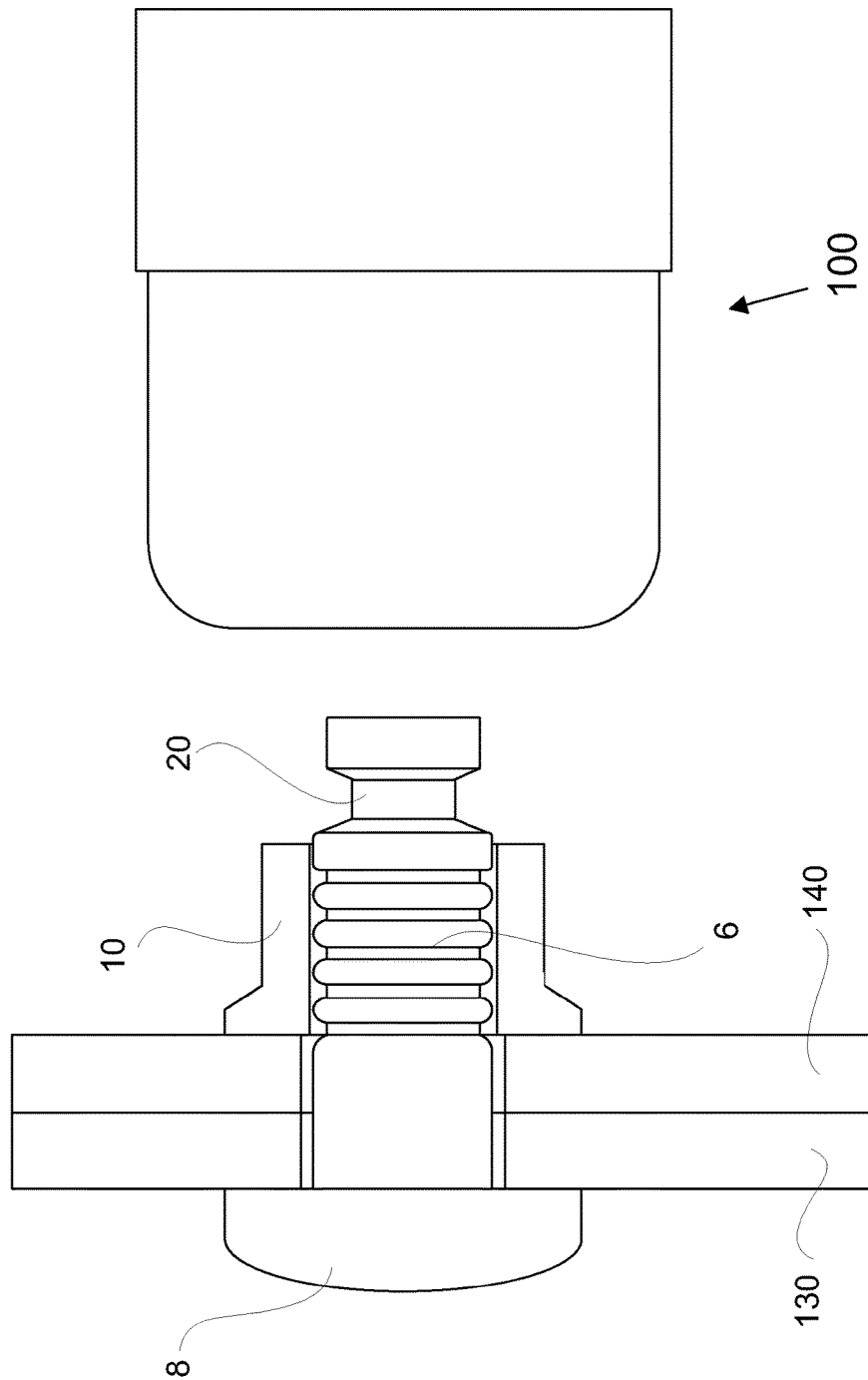
Figure 11A:
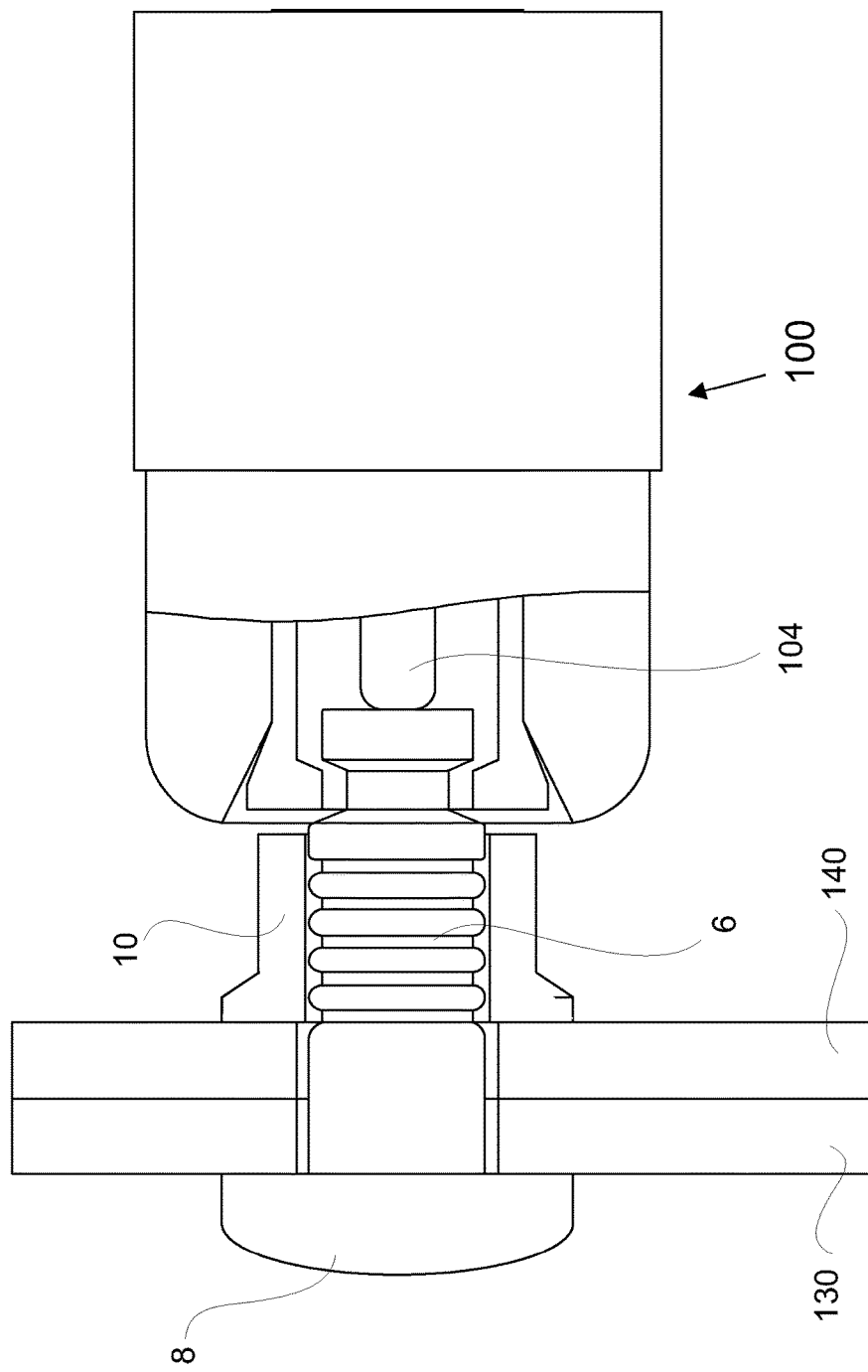
Figure 12:
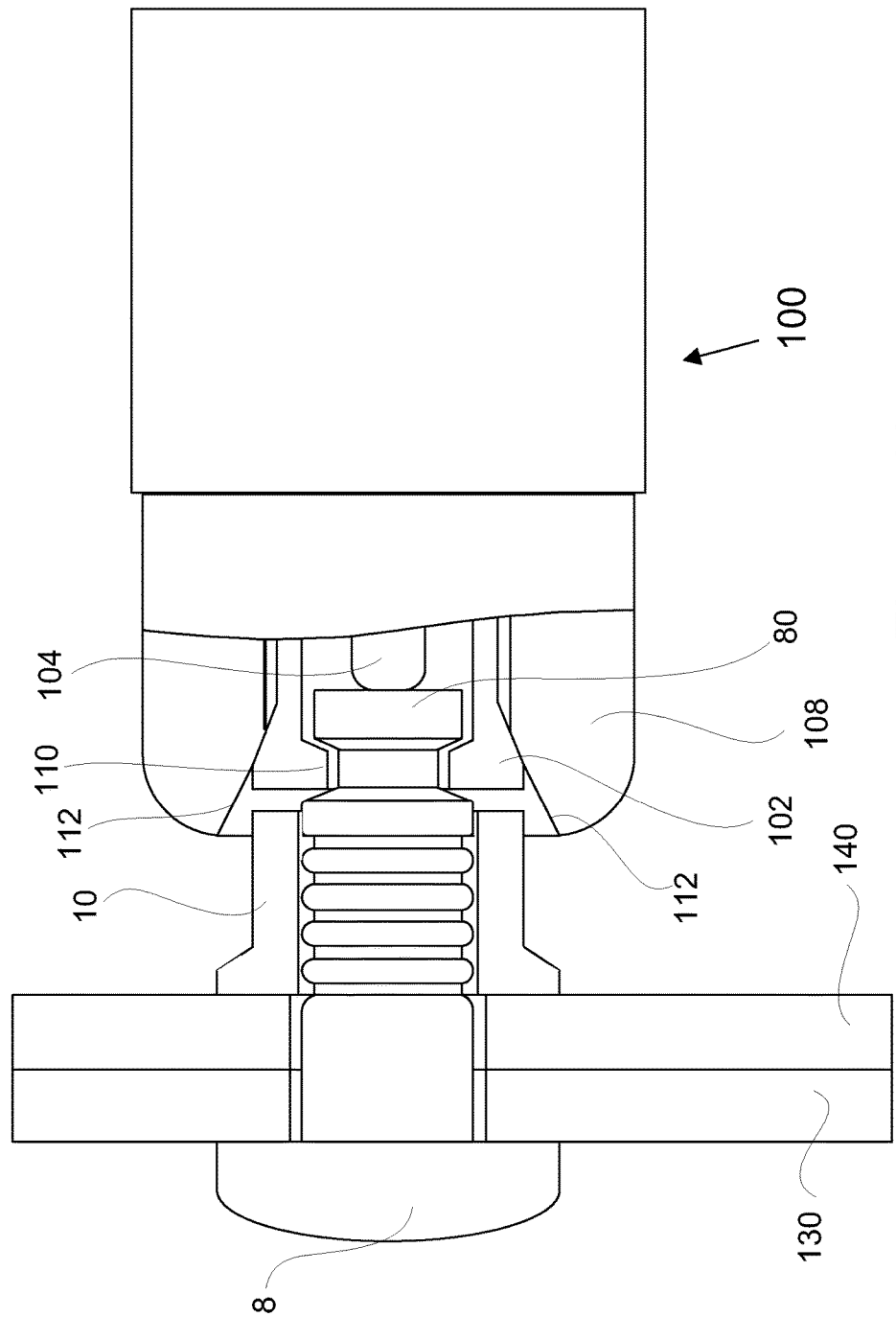
Figure 13:
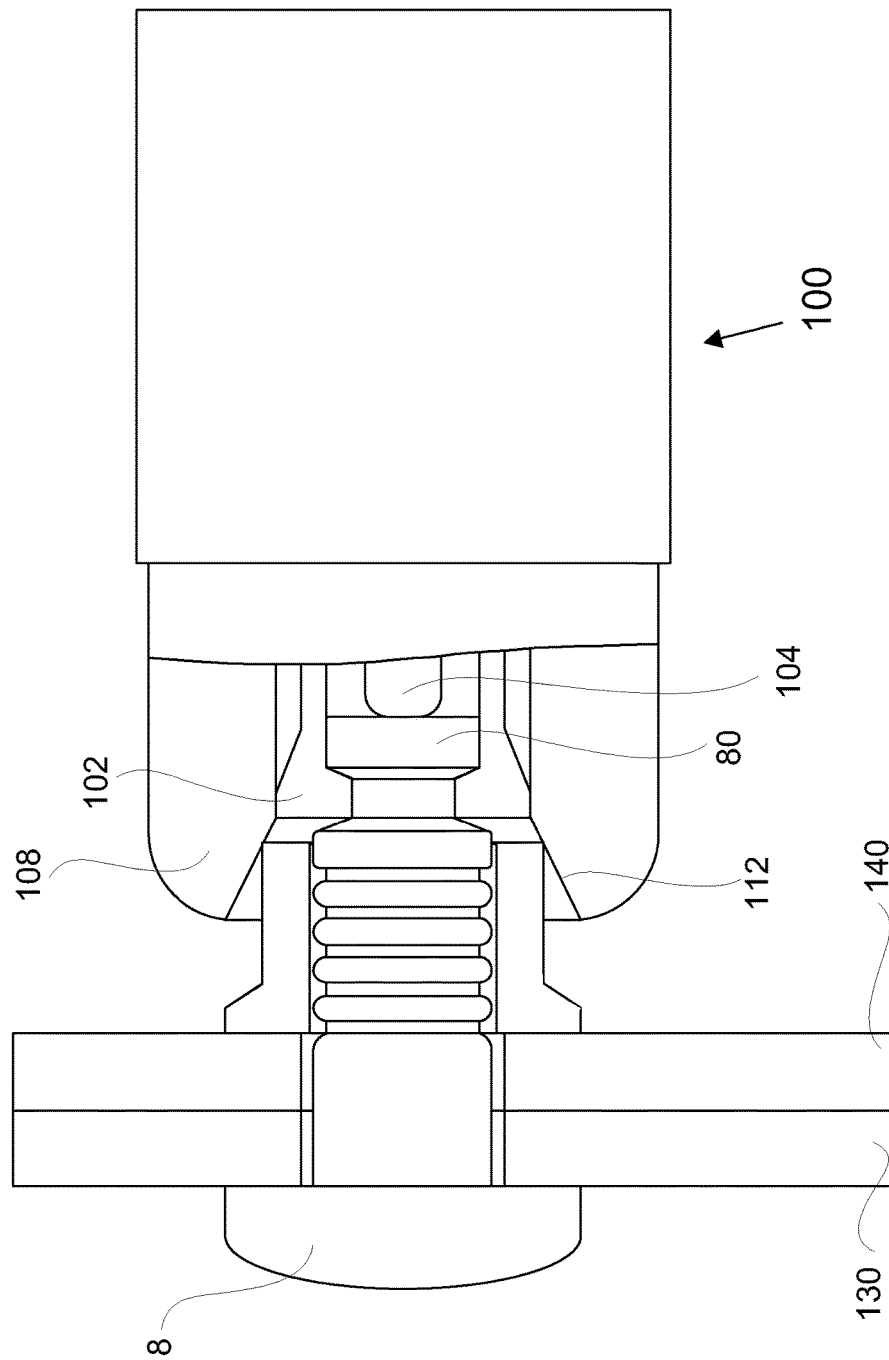
Figure 14:
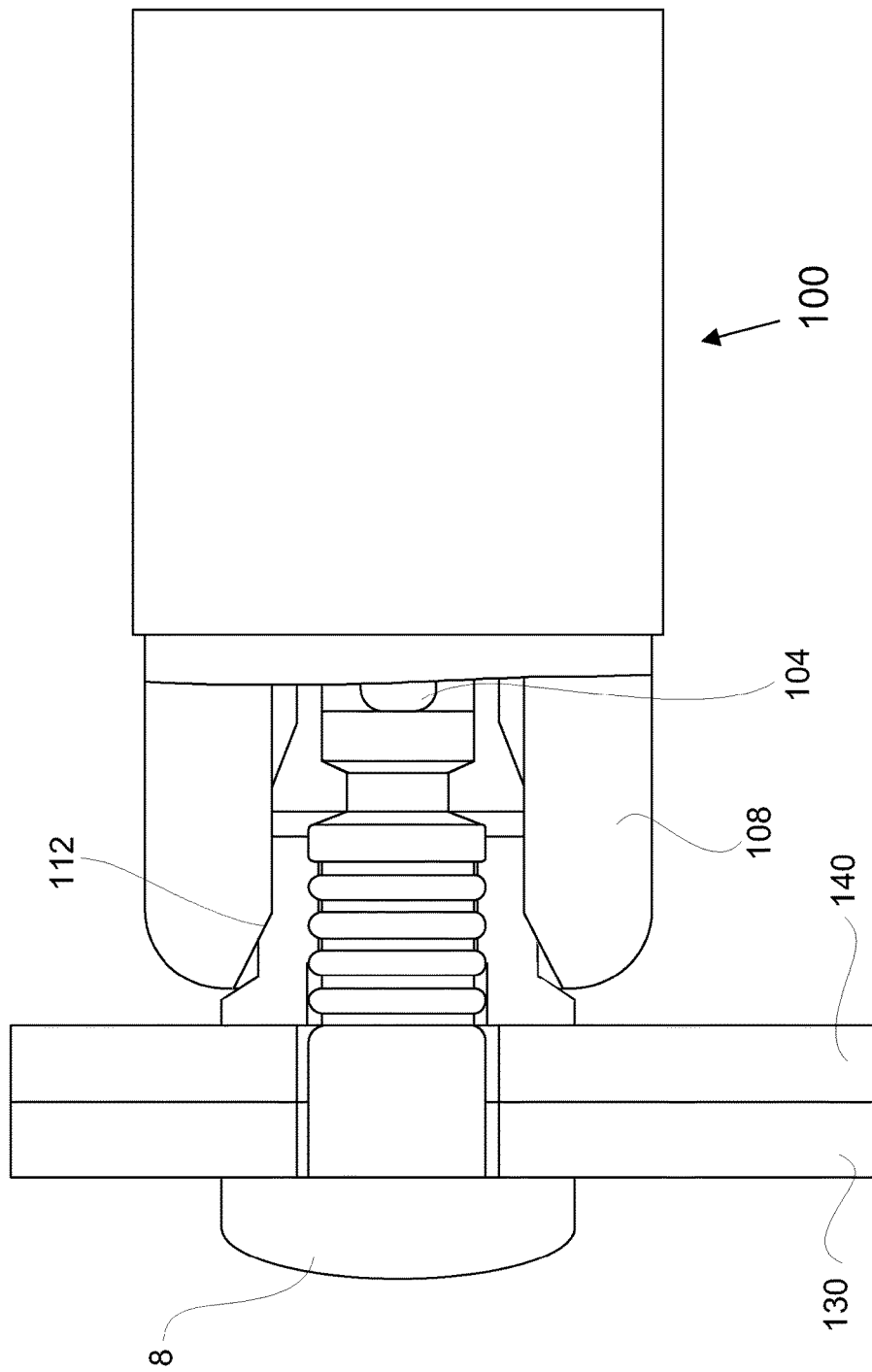
Figure 15:
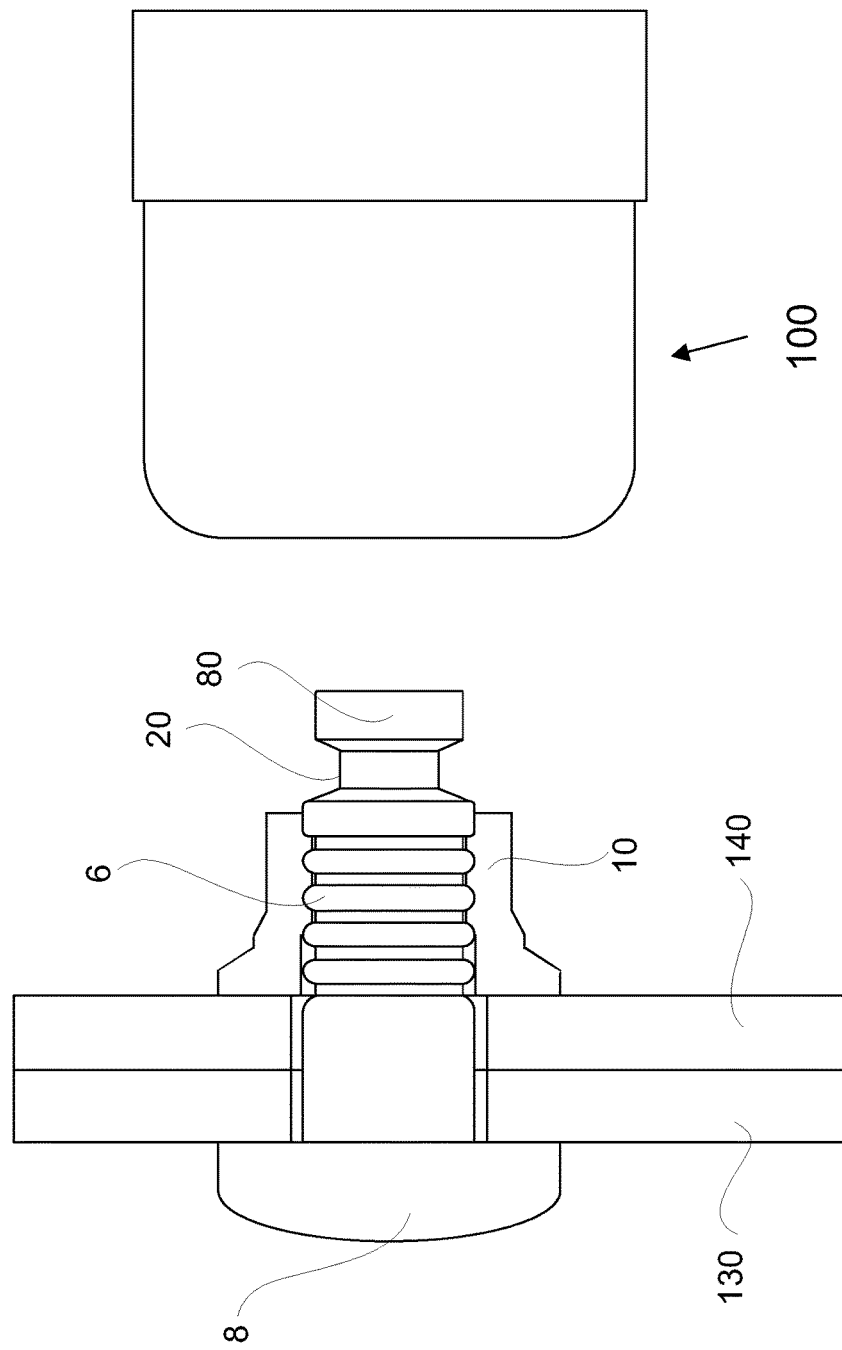

Referring to the figures, a lockbolt 2 in accordance with a first aspect of the present invention comprises a pin 4 comprising a pin tail 6 and a pin head 8, and a collar 10 having a throughbore 12 (FIG. 7). A locking portion 36 comprising annular locking grooves 18 is provided on the pin tail 6, and a single pull groove 20 is provided between the locking portion 36 and end face 22 of the pin tail 6 remote from the pin head 8. A plain end portion 80 is provided between the locking grooves 18 and the end face 22 of the pin tail 6. The end portion 80 is short, relative to the length of the locking portion 36, and is of a smaller maximum diameter than the maximum diameter of the locking portion 36. In an exemplary embodiment, where D is the maximum diameter of the locking portion 36, G is the minimum diameter of the pull groove 20 (in the embodiment shown in the figures, the minimum diameter of the pull groove 20 is at a groove root 28), and T is the maximum diameter of the end portion 80, the following applies:

G=0.675 D (and more generally is within the range 0.50 D to 0.78 D);

T=0.836 D (and more generally is within the range 0.7 D to 1.0 D).

Furthermore, wherein L is the total length of the pin tail 6 over which the pull groove 20 and end portion 80 extend, N is the length over which the end portion 80 extends, and M is length over which the pull groove 20 extends, the following applies:

L=0.936 D (and more generally is within the range 0.7 D to 1.2 D);

M=0.581 D (and more generally is within the range 0.3 D to 0.7 D);

N=0.355 D (and more generally is within the range 0.26 D to 0.5 D).

The single pull groove 20 includes a first tapered section 26, a second tapered section 30 (the second tapered section 30 being closer to the tail end 22 of the pin 6 than the first tapered section 26), and the groove root 28, having a constant cross-sectional area along its length between the first tapered portion 26 and the second tapered portion 30, i.e. the groove root 28 is parallel to the axis of the pin tail 6.

FIGS. 6 to 15 show successive stages of installation of a lockbolt 2 into apertures 120, 122 of a workpiece comprising workpiece members 130 and 140, including using an installation tool 100, thereby to secure the workpiece members 130 and 140 together.

Initially, the pin 4 is inserted by an operator by hand into the apertures 120, 122 of the workpiece members 130, 140, from the rear side 150 of the workpiece, as shown in FIG. 6, until the underside 34 of the head contact the rear surface 152 of the workpiece. At this stage, part of the pin tail 6 protrudes from the front side 160 of the workpiece. The collar 10 is then fitted by hand onto the protruding end of the pin tail 9, from the front side 160 of the workpiece, as shown in FIG. 7.

Figure 1:
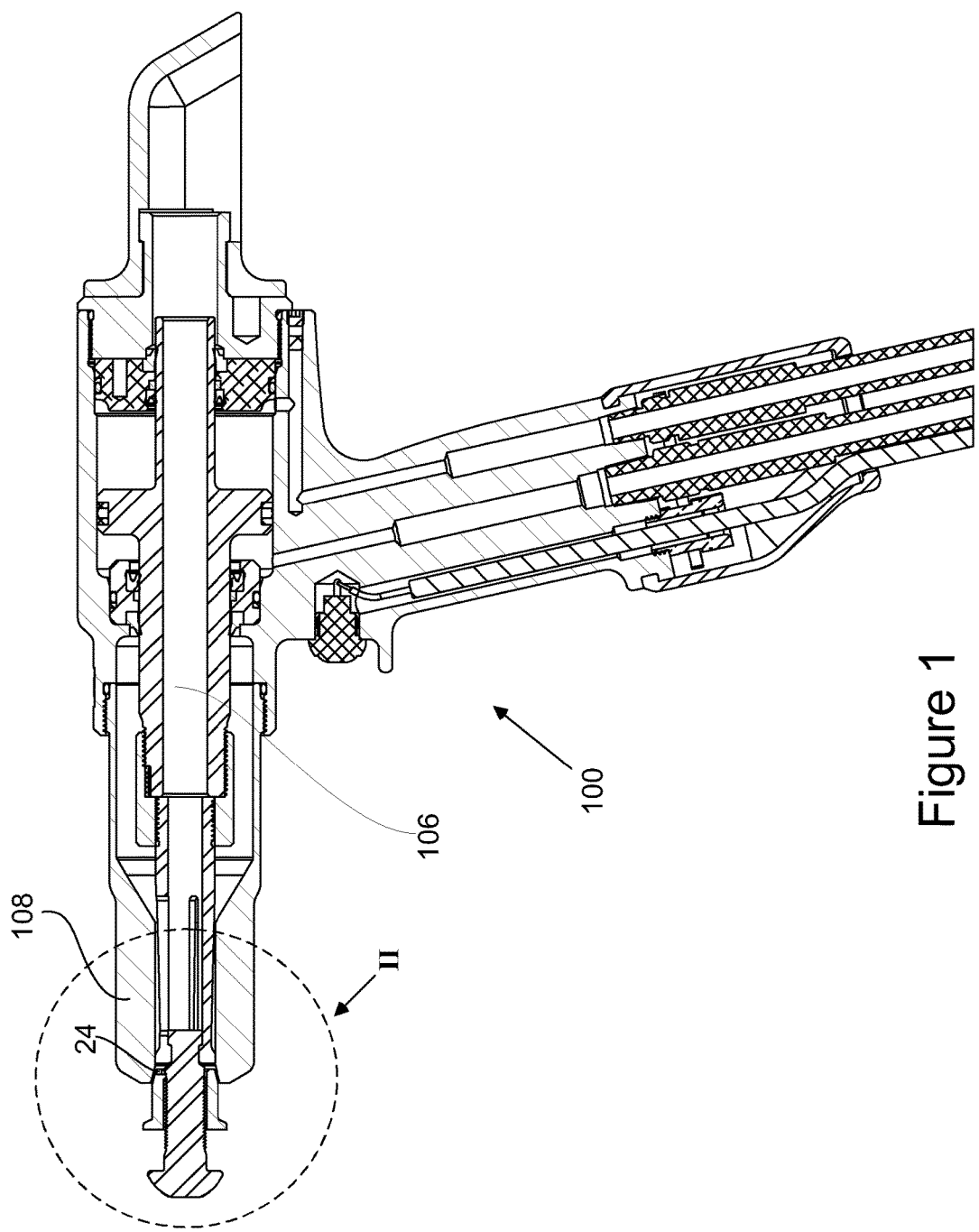
FIG. 1 is a cross-sectional side view of a lockbolt according to the present invention inserted into a hydraulically powered installation tool ready for installation of the lockbolt into a workpiece (the workpiece is shown in later figures)
Figure 2:
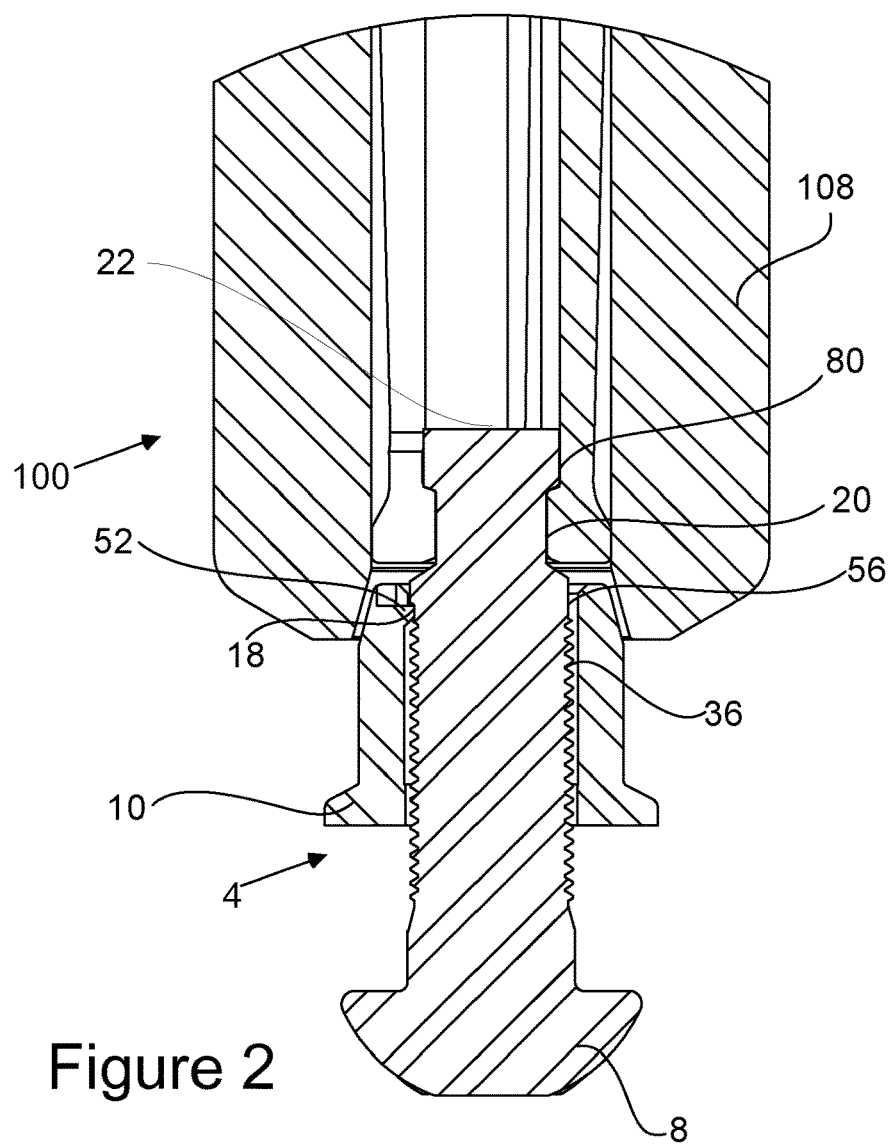
FIG. 2 is a detailed cross-sectional view of the lockbolt and installation of tool of FIG. 1 indicated as area II on FIG. 1, with the retaining feature in an engaged condition.

After the collar 10 has been fitted onto the pin 4, the collar 10 is positively retained in an initial assembly condition (or an engaged position) on the pin 4. This positive engagement is achieved by a retaining feature 24. In the embodiment as shown in FIGS. 1 and 2, the retaining feature 24 is a 'push-and-twist' type feature, comprising a shallow axial slot 56 provided on the pin tail 6, and a tab 52 provided on the throughbore 12 of the collar 10. The axial slot 50 allows the tab 52 to pass down to the first locking groove 18 of the locking portion 36; the collar is then rotated by 180° thereby causing the tab 52 to engage the first locking groove 18. In FIG. 2, the retaining feature 24 is shown in an engaged position. For clarity, a retaining feature 24 is not shown in the installation sequence figures.

The retaining feature 24 provides a sufficient degree of retention force to maintain the collar on the pin until the installation tool is used to for the next stage of installation. When the installation tool is actuated, the retention force is overcome by the swaging stroke of the installation tool, and is weak enough not to adversely influence the sheet take-up and swaging action of the collar 10 during installation into the workpiece.

The lockbolt 2 is then installed into the workpiece by use of the installation tool 100. The installation tool 100 includes a split collet 102 (FIGS. 10 to 14), surrounded by a nosepiece 108.

A sprung plunger 104 (FIGS. 11 to 14) having a rounded tip 114 (shown most clearly in FIGS. 11b and 11c) is provided within the installation tool 100, which engages with a dimpled recess 32 provided in the end face 22 of the lockbolt pin. The plunger is depressed by the end face 22 of the lockbolt pin 6 when the pin tail 6 is entered into the open collet 102. The engagement of the plunger 104 in the dimpled recess 32 ensures that the pin tail is in the correct position within the installation tool 100, i.e. that it is not titled at an unacceptable angle relative to the tool axis. Depression of the plunger 104 allows the operator to commence installation of the lockbolt 2. Unsafe operation of the tool with a pin tail incorrectly positioned inside the tool collet, or with no pin and thus a greater risk of entrapment to the operator, is thereby avoided.

Upon actuation of the installation tool 100, by a hydraulic piston 106 (shown in FIG. 1) exerts an increasing pulling force on the collet 102, thereby pulling the collet 102 into the tool 100, and thereby exerting a pulling force on the pin tail 6 via the pull groove 20. As the collet 102 is pulled into the tool 100, the tapered anvil portion 112 of the nosepiece 108 causes the collet 102 to close around the end of the pin tail 6, and an internal lip 110 of the collet 102 engages with the single pull groove 20, at the contact surface provided by second tapered section 30. In the embodiment illustrated herein, the internal lip 110 of the collet 102 has a shape complimentary to at least part of that of the pull groove 20, i.e. complimentary to the groove root 28 and the second tapered section 30 of the pull groove 20, therefore the collet 102 engages the plain groove root 28 and the second tapered section 30.

The pulling force which is applied to the collet 20 by the hydraulic piston 106 is transferred to the pin tail 6 via the contact surface provided by the tapered portion 30 of the pull groove 20. Therefore as the collet 20 is pulled into the tool 100, the pin tail 6 is also pulled in towards the tool 100.

Subsequently, as the collet 102 is pulled further into the tool 100 by hydraulic piston, the anvil portion 112 of the nosepiece 108 comes into contact with the collar 10, and the collar 10 is progressively pushed by the anvil 112, in the direction of the pin head 8. The workpiece members 130, 140 are thereby pushed together, closing any gap between them, and a clamp load is applied to the workpiece. As the force applied by the tool 100 increases, the anvil portion 112 gradually swages the collar 10 down into the locking grooves 18 of the pin tail 6, i.e. the material of the collar 10 is forced into locking grooves 18.

The force applied by the tool, and thereby also the swaging of the collar 10 onto the locking groves 18, is halted when the force reaches a pre-set maximum value. The hydraulic piston 106 then returns to its pre-actuation position and the anvil portion 112 retracts from the fully swaged collar 10. When the collar 10 has been fully swaged onto the pin tail 6, the collar is securely fixed to the pin 4 and the two components cannot become accidentally separated.

Figure 16:
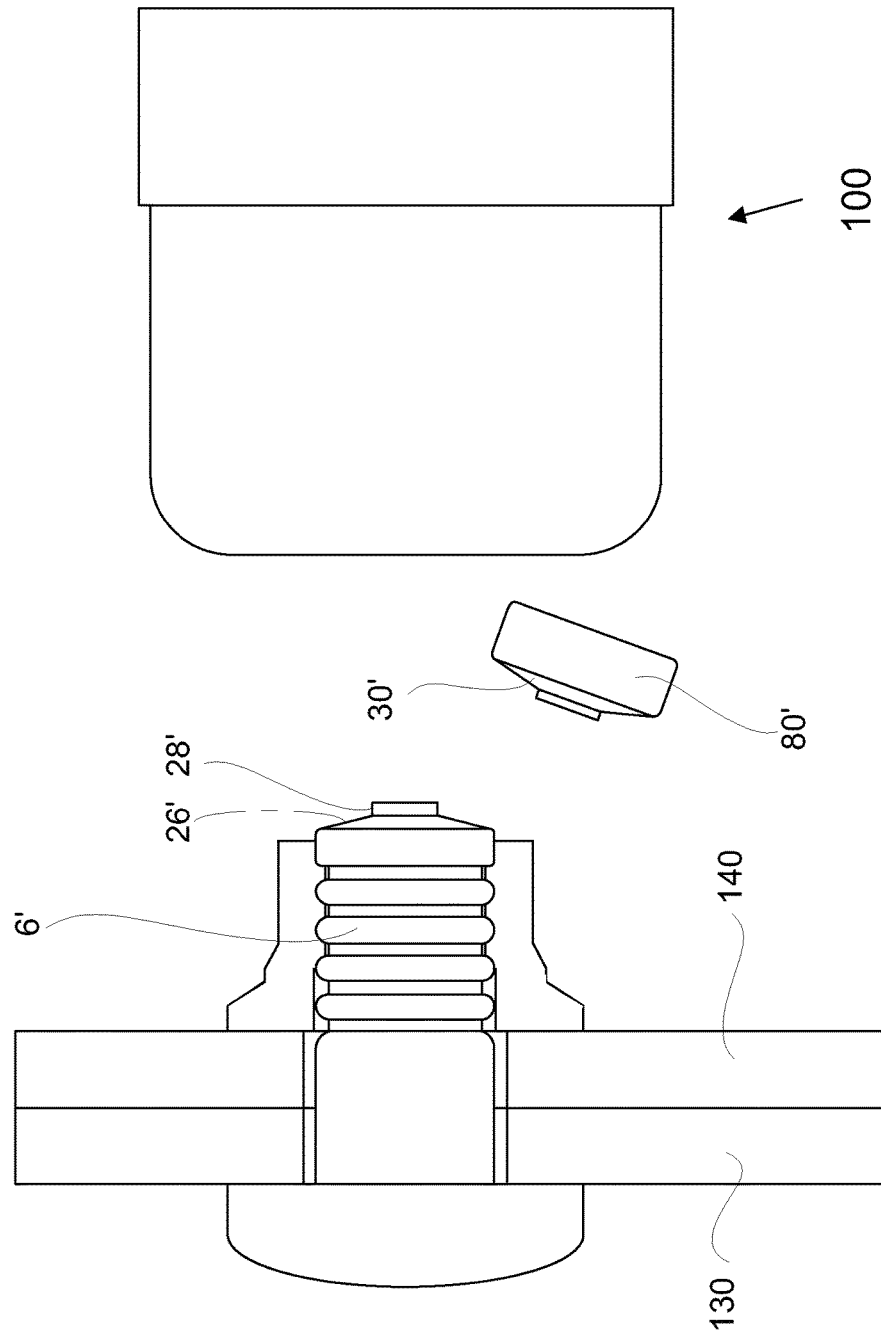
FIG. 16 shows an installation stage of an alternative embodiment of lockbolt in accordance with the present invention.

In the embodiment discussed above, the end of the pin tail 6 does not break off during installation of the lockbolt 2 into a workpiece. However, in the alternative embodiment of lockbolt 2' shown in FIG. 16, the end portion 80' of the pin tail 6' is caused to break off during installation, as a result of the single pull groove 20' being deeper than the pull groove 20 of the first embodiment, i.e. the first tapered section 26' and the second section 30' are steeper than those of the first portion (and as a result the groove root 28' has a smaller diameter). The pull groove therefore acts as a breaker groove. In this embodiment, the installation tool applies a pulling force to the pin tail 6' until the pin tail fractures at the breaker groove/pull groove 20. The broken-off pin portion 80' is ejected from the installation tool 100 after the installation cycle. In this embodiment, the form of the internal lip 110 of the collet 102 (not shown in FIG. 16) may not correspond to that of the pull groove 20', however the force of the tool will still be transferred to the pin tail 6' via the contact surface provided by the tapered section 30'.

In a further embodiment (not shown), the contact surface may be formed of an alternatively feature of the pull groove, for example a shoulder, providing a contact surface 90° to the axis of the pin tail 6.

The retaining feature 24 may alternatively comprise a short helical screw thread 54 (shown in FIG. 2*a*) provided on a section of the pin tail 6" adjacent the pull groove 20, and a corresponding short screw thread, helix or tab provided in the throughbore 12 of the collar 10 into which the locking portion screw thread engages. As the collar 10 will be swaged predominantly or entirely into the annular locking grooves 18 beyond, there is no risk of unscrewing of the collar and pin tail 6.

In a further alternative embodiment, the retaining feature 24 could comprise an elastomeric bead or ring, provided either on the throughbore 12 of the collar 10 or on the locking grooves 18 of the pin tail 6.

Figure 2A:
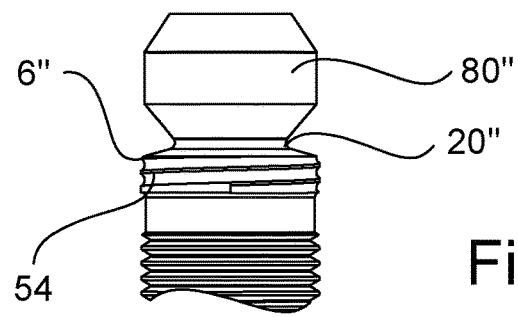
FIG. 2a is a partial side view of the pin tail of an alternative lockbolt in accordance with the present invention.
Figure 4:
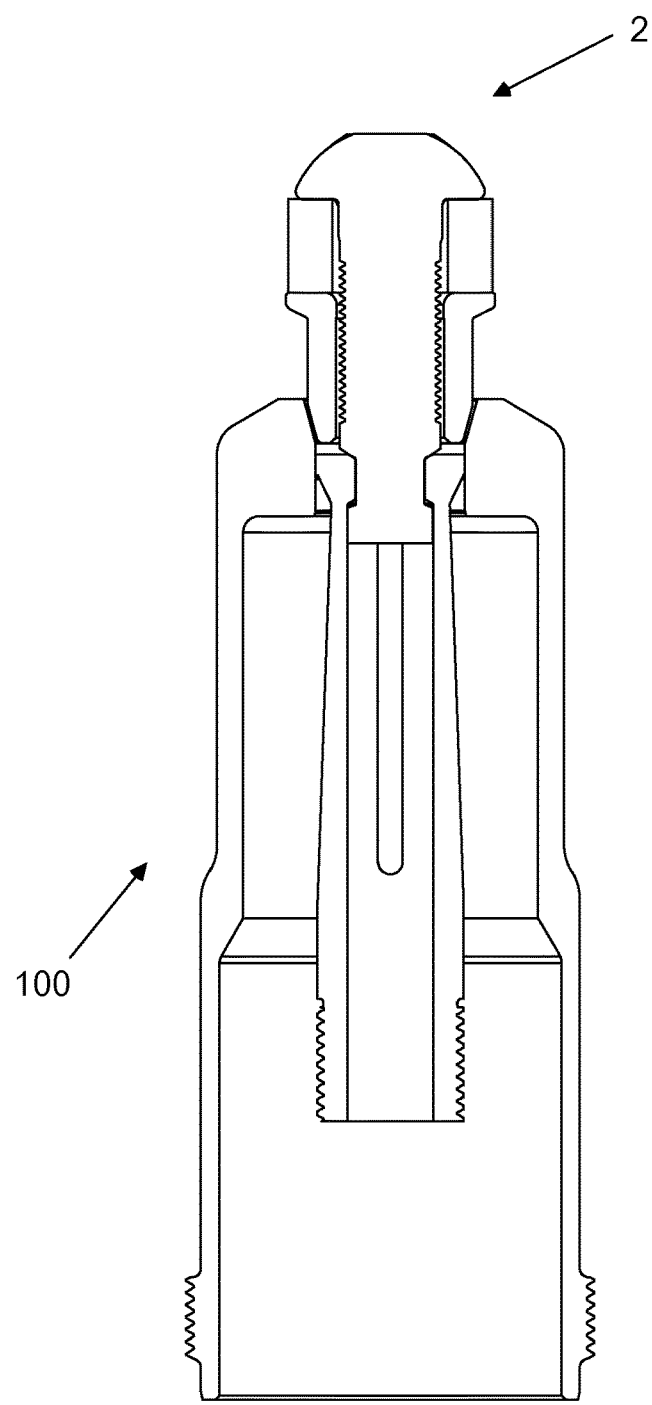
FIG. 4 is a cross-sectional view of the tool of FIG. 3b along the line IV-IV, ready to install a lockbolt in accordance with the present invention.
Figure 5A:
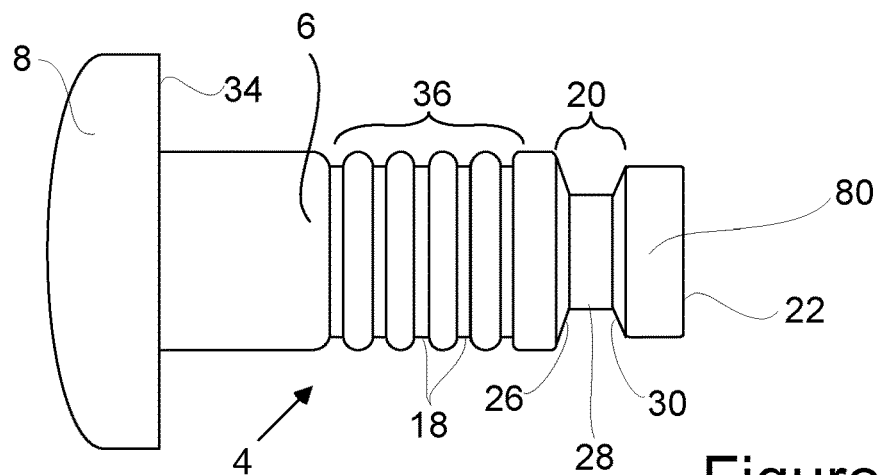
FIGS. 5a and 5b are simplified side views of a lockbolt pin in accordance with the present invention, with collar retaining features removed for clarity.
Figure 5B:
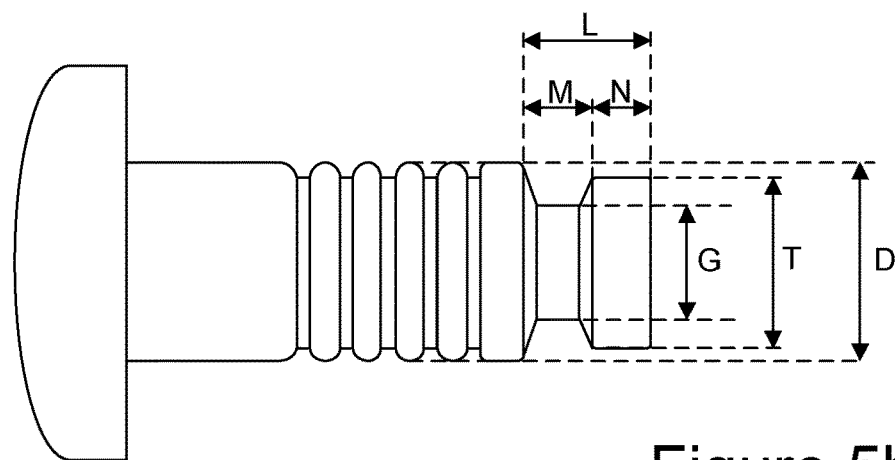
Figure 5C:
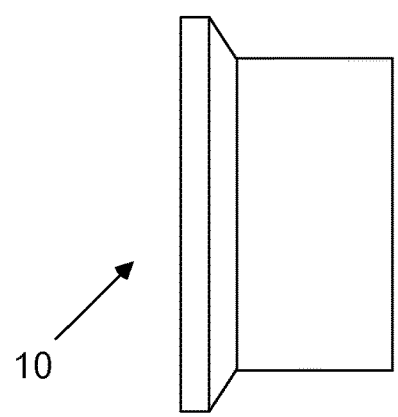
FIG. 5c is a simplified side view of a lockbolt collar in accordance with the present invention.

In alternative embodiments, a pull groove having a different profile, for example only being comprised of the two tapered sections 26 and 30 and not having a parallel groove root 28, i.e. a grove root having a constant cross-sectional area along its length, may be provided. An example of a pull groove 20" having an alternative form is shown in FIG. 2*a*. Similarly, the form profile and shape of the installation tool collet 102 may also differ. More specifically the form of the internal lip 110 of the collet 102 may not correspond partially to that of the pull groove 20, however contact will still be made between the internal lip 110 of the collet 102 and a tapered portion of the pull groove.

The end portion 80 of the pin tail 6 may also have a different profile, such as alternative end portion 80" shown in FIG. 2*a*.

The invention claimed is:

1. A lockbolt comprising a collar and a pin;
   the pin comprising a pin head and a pin tail adapted to be inserted through aligned apertures in workpiece members;
   the pin tail comprising:
   a locking portion comprising locking grooves,
   only a single pull groove, the single pull groove including a first tapered section, a second tapered section and a plain portion between the first tapered section and the second tapered section, one of the first tapered section and the second tapered section of the single pull groove providing a contact surface against which an axial pulling force can be applied, the single pull groove being provided between the locking portion and an end face of the pin tail remote from the pin head, and
   an end portion provided between the pull groove and the end face;
   the collar being adapted to be fitted over the locking grooves and swaged onto the locking grooves.

2. A lockbolt as claimed in claim 1, wherein the combined length of the single pull groove and end portion is shorter than the locking portion, and has a maximum diameter which is smaller than a maximum diameter of the locking portion.

3. A lockbolt as claimed in claim 1 wherein the ratio of the minimum diameter of the single pull groove to the maximum diameter of the locking portion is within the range 0.50 to 0.78.

4. A lockbolt as claimed in claim 1 wherein the ratio of the maximum diameter of the end portion to the maximum diameter of the locking portion, is within the range 0.7 to 1.0.

5. A lockbolt as claimed in claim 1 wherein the ratio of the total length of the pin tail over which the single pull groove and the end portion extends, to the maximum diameter of the locking portion, is within the range 0.7 to 1.2.

6. A lockbolt as claimed in claim 1 wherein the ratio of the length of the pin tail over which the single pull groove extends, to the maximum diameter of the locking portion, is within the range 0.3 to 0.7.

7. A lockbolt as claimed in claim 1 wherein the ratio of the length of the pin tail over which the end portion extends, to the maximum diameter of the locking portion, is within the range 0.26 to 0.5.

8. A lockbolt as claimed in claim 1 further comprising a retaining feature to retain the collar in an initial assembly position on the pin.

9. A lockbolt as claimed in claim 8 wherein the retaining feature comprises a helical screw thread provided on a section of the locking portion adjacent the single pull groove, and a corresponding screw thread, helix or tab provided in the throughbore of the collar into which the helical screw thread provided on the locking portion engages.

10. A lockbolt as claimed in claim 8 wherein the retaining feature comprises a shallow axial slot or flat provided on the pin tail, which allows a tab provided on the throughbore of the collar to pass down to a first locking groove of the locking portion, into which the collar tab can be rotated to engage, in a 'push-and-twist' motion.

11. A lockbolt as claimed in claim 8 wherein the retaining feature comprises an elastomeric bead or ring, provided either on the throughbore of the collar or on the locking grooves of the pin tail.

12. Apparatus for installing a lockbolt comprising a lockbolt according to claim 1, and an installation tool comprising a collet surrounded by a nosepiece, the nosepiece being provided with a tapered anvil portion.

13. Apparatus as claimed in claim 12 wherein the installation tool further comprises a depressible plunger, wherein the tool is disabled whilst the plunger is not depressed.

14. Apparatus as claimed in claim 13 wherein the plunger has a rounded tip which is engageable with a dimple provided in the end face of the lockbolt pin tail.

15. Apparatus as claimed in claim 12 wherein part of the collet has a shape complementary to at least part of the shape of the single pull groove.

16. A method of installing a lockbolt according to claim 1 into a workpiece comprising apertured workpiece members thereby to secure the workpiece members together, using an installation tool comprising a hydraulic piston, a collet surrounded by a nosepiece provided with an tapered anvil portion,
   the method comprising steps of:
   inserting the pin into the apertures of the workpieces from a rear side of the workpiece until the underside of the pin head contacts a rear side of the workpiece and the pin tail partially protrudes from a front side of the workpiece;
   fitting the collar onto the protruding end of the pin tail from the front side of the workpiece;
   actuating the tool thereby applying a pulling force to the collet, such that the tapered anvil portion of the nosepiece causes the collet to close and therefore engage the contact surface of the single pull groove, thereby applying a pulling force to the pin tail via the single pull groove, and
   subsequently causing the collar to be pushed towards the workpiece members thereby to bring the workpiece members together, and subsequently causing the tapered anvil portion of the nosepiece to apply a force to the collar, thereby to gradually swage the collar into the locking grooves of the pin tail.

17. A method as claimed in claim 16 wherein the force applied by the tool is halted when the force reaches a pre-set maximum value, wherein the tapered anvil portion retracts from the collar.

18. A method as claimed in claim 16 wherein the force applied by the tool is halted when a part of the pin tail is caused to break off at a breaker groove formed by the single pull groove.

19. A method as claimed in claim 16 wherein the lockbolt further comprises retaining means such that after the collar has been fitted onto the pin, and before the installation tool is used to install the lockbolt in the workpiece, the collar is maintained on the pin in an initial assembly condition.

20. A tool for use in installing a lockbolt according to claim 1 into a workpiece comprising apertured workpiece members, the tool comprising a hydraulic piston and a collet, wherein on actuation of the tool, the collet moves from an open position to a closed position and is pulled into the tool by the hydraulic piston, wherein the collet includes only a single pulling lip, and wherein the collet is configured to be closed around the lockbolt such that the single pulling lip engages the single pull groove of the lockbolt and thereby causes the lockbolt to be pulled into the tool.

\* \* \* \* \*